(12) United States Patent
Kwok et al.

(10) Patent No.: US 7,499,387 B2
(45) Date of Patent: Mar. 3, 2009

(54) METHOD AND APPLIANCE FOR COPYING DATA FROM A TAPE ONTO A STORAGE MEDIUM

(75) Inventors: Kwong Heng Kwok, Singapore (SG); Lee Cheng Yu, Singapore (SG)

(73) Assignee: Thomson Licensing, Boulogne Billancourt (FR)

( * ) Notice: Subject to any disclaimer, the term of this patent is extended or adjusted under 35 U.S.C. 154(b) by 330 days.

(21) Appl. No.: 10/581,770

(22) PCT Filed: Nov. 4, 2004

(86) PCT No.: PCT/EP2004/012482

§ 371 (c)(1),
(2), (4) Date: Jun. 6, 2006

(87) PCT Pub. No.: WO2005/059914

PCT Pub. Date: Jun. 30, 2005

(65) Prior Publication Data

US 2007/0121250 A1    May 31, 2007

(30) Foreign Application Priority Data

Dec. 9, 2003    (EP) ................................. 03300249

(51) Int. Cl.
*G11B 7/28* (2006.01)
*G11B 5/09* (2006.01)
(52) U.S. Cl. ...................................... 369/85; 369/47.12
(58) Field of Classification Search ........................ None
See application file for complete search history.

(56) References Cited

U.S. PATENT DOCUMENTS

| 4,410,917 | A |   | 10/1983 | Newdoll et al. |
|---|---|---|---|---|
| 5,197,051 | A | * | 3/1993 | Tomoda et al. ............. 369/14 |
| 5,521,898 | A | * | 5/1996 | Ogasawara ............. 386/112 |
| 6,125,013 | A |   | 9/2000 | Choung |
| 7,362,948 | B2 | * | 4/2008 | Kobayashi ............. 386/52 |
| 2001/0038745 | A1 |   | 11/2001 | Sugimoto et al. |

FOREIGN PATENT DOCUMENTS

DE    3420998    12/1985
EP    0306009    3/1989

OTHER PUBLICATIONS

Search Report Dated Feb. 24, 2005.

* cited by examiner

*Primary Examiner*—Peter Vincent Agustin
(74) *Attorney, Agent, or Firm*—Robert D. Shedd; Robert B. Levy; Jorge Tony Villahon

(57) ABSTRACT

The method for copying data from a tape onto a storage medium comprises the steps of scanning the tape in a fast winding operation, counting control pulses present on the tape during the fast winding operation in a counter, defining a compression rate in dependency of the number of control pulses and the capacity of the optical medium, reading the data from the tape and writing the data onto the storage medium by using said compression rate. The appliance comprises a media recorder, a tape recorder and a micro-controller for performing the method. The appliance allows in particular, copying in an automated procedure all information being recorded on the tape onto the storage medium via a one touch copy operation, by making optimum use of the capacity of the storage medium.

11 Claims, 2 Drawing Sheets

METHOD AND APPLIANCE FOR COPYING DATA FROM A TAPE ONTO A STORAGE MEDIUM

This application claims the benefit, under 35 U.S.C. § 365 of International Application PCT/EP04/012482, filed Nov. 4, 2004, which was published in accordance with PCT Article 21(2) on Jun. 30, 2005 in English and which claims the benefit of European patent application No. 03300249.4, filed Dec. 9, 2003.

BACKGROUND OF THE INVENTION

The present invention relates to a method and an appliance for copying data from a tape onto a storage medium and relates in particular to a method and an appliance for copying recordings from a VHS tape from a video recorder onto an optical recording medium, for example onto a Digital Versatile Disk (DVD).

In the consumer electronics market, the DVD is dominating more and more over the VHS cassettes. Today, DVD recorders are already available, which allow a user, to copy a movie or a television broadcast directly onto a DVD. The DVD recorders will be replacing more and more the still widely used VHS recorders. Optical recording mediums are for example disks according to the DVD+R or DVD−R standard. However, these disks allow only one copy operation on the area of the optical medium, comparable with the recording onto a recordable Compact Disk (CD-R).

SUMMARY OF THE INVENTION

It is therefore an object of the present invention, to provide a method and an appliance for copying data from a tape onto a storage medium, which provides an efficient use of the available recording capacity of the storage medium.

This object is a achieved for a method according to the invention as specified in claim 1, and for an appliance according to the invention as specified in claim 9. Advantageous embodiments of the invention are specified in the subclaims.

The method for copying data from a tape onto a storage medium comprises the steps of
 a) scanning the tape in a fast winding operation,
 b) counting control pulses recorded onto the tape during a fast winding operation in a counter,
 c) calculating from the number of control pulses the run length of the recording,
 d) defining a compression rate in accordance with the capacity of the optical medium, and
 e) reading the data from the tape and recording the data onto the optical medium by using said compression rate.

Parts of the tape, which do not have any control pulses, are therefore not copied onto the optical medium. By using the total number of the control pulses of the recording, the run length of the recording can be estimated, and a compression rate for recording the data onto the storage medium can be estimated by taking into account the capacity of the storage medium, for making efficient use of the recording capacity of the storage medium.

The tape is for example a VHS tape or a DV tape according to the respective standard, and the storage medium is for example a recordable DVD, a Hard Disk (HDD) or a semiconductor memory, i.e. a flash memory card. Recordings on a VHS tape or a DV tape comprise control pulses on a longitudinal track of the tape, which is a measure of the run length of the recording. With the inventive method, it is therefore possible to copy all recordings of a tape onto another storage medium by making optimum use of the capacity of the storage medium.

The appliance comprises a tape recorder, a media recorder and a micro-controller, which performs the method for copying data from a tape onto a storage medium, as described. The appliance comprises in particular a VHS tape recorder or a DV recorder as the tape recorder, and a DVD recorder as the media recorder. The method allows in particular a one touch copy operation, performed by the micro-controller in an automated procedure, for copying all recordings of a tape onto a recordable storage medium, for the convenience of a user.

BRIEF DESCRIPTION OF THE DRAWINGS

Preferred embodiments of the invention are explained in more detail with regard to schematic drawings, which show.

DETAILED DESCRIPTION OF PREFERRED EMBODIMENTS

Figure 1:
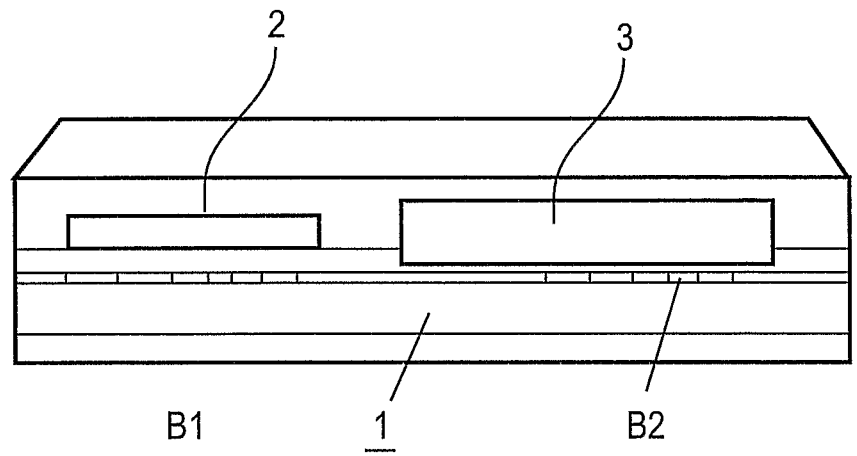
FIG. 1 An appliance comprising a tape recorder and an optical media recorder,
 FIG. 2 a tape with control pulses on a longitudinal track,
 FIG. 3 a flow chart showing steps of a copy operation, and
 FIG. 4 the tape of FIG. 2 showing reading sequences in accordance with the method of FIG. 3.

In FIG. 1 an appliance 1 is shown comprising an optical media recorder 2 and a tape recorder 3. The optical media recorder 2 is in particular a DVD recorder. The tape recorder 3 is in particular a VHS recorder or a DV recorder. The appliance 1 comprises further a micro-controller with associated memory (not shown) for copying data from a tape being inserted into the tape recorder 3 onto an optical storage medium being inserted into the optical recorder 2.

The appliance 1 comprises control buttons B1, B2 being arranged on the front side of the appliance 1 and on a remote control (not shown) for the operation of the appliance 1. The appliance 1 allows in particular, to copy all information being recorded on the tape onto the optical storage medium in an efficient manner via a one touch copy operation, when requested by a user.

Figure 2:
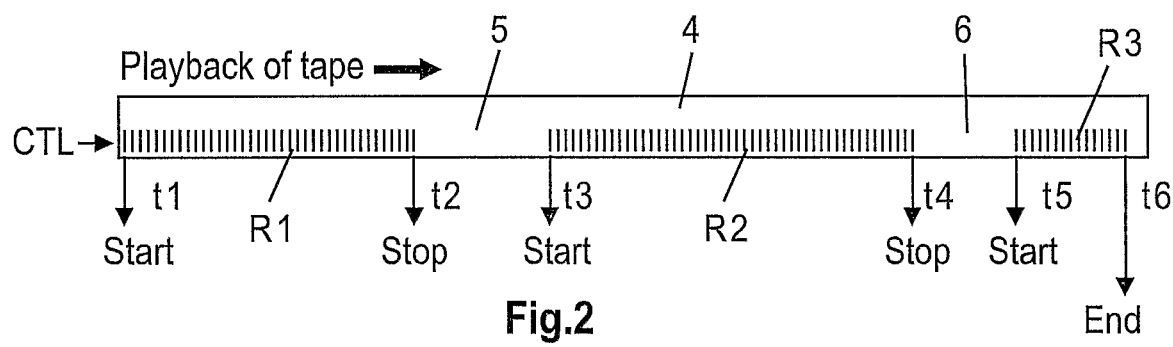

In FIG. 2, a tape 4 is shown, which shows in a simplified manner recording structures of three recordings R1, R2 and R3. As known, the data from recordings according to the VHS or DV standard are stored in oblique tracks of the tape 4. The recordings R1, R2, R3 comprise also control pulses CTL recorded on a longitudinal track of the tape 4. As shown in FIG. 2, the recording R1 extends between a time interval t1-t2, the recording R2 between time interval t3-t4, and the recording R3 between a time interval t5-t6, when the tape is played back. Between the recordings R1 and R2, a blank part 5 is shown, and between the recordings R2 and R3 a blank part 6 is shown, which do not have any data recording.

It is known that recordings on a VHS tape can be made with difference speeds, known for example as Standard Play (SP), Long Play (LP) and Extended Long Play (EP). For finding quickly a location on the tape, or for rewinding the tape, fast forward winding operations and fast reverse winding operations are known. For playing back a recording of the tape 4, there exist besides the normal standard playback further operating modes, known as slow motion playback and fast motion playback.

With the inventive method, all recordings R1, R2, R3 are recorded in an efficient manner onto a storage medium. A preferred embodiment of the method is now explained with regard to the flowchart shown in FIG. 3. In the first step A, the tape 4 is rewound in a fast rewind operation to the beginning of the tape 4, when a user pushes a respective button on the appliance 1 or on the remote control of the appliance 1.

In the second step B, the tape 4 is scanned in a fast winding operation. During the scanning of the tape, the control pulses CTL present on the longitudinal track of the tape 4 are counted by the micro-controller, for example by adding up the control pulses in a register of the memory. From the total number of the CTL control pulses, the run length of the recordings R1, R2, R3 is calculated, by converting the number of control pulses into the respective time. This can be done in a known manner, because the CTL control pulses are in a fixed relation to the fields of the pictures stored on the tape 4. With this method, also the different recording modes Standard Play, Long Play and Extended Long Play are taken into account. Not included are the blank parts 5 and 6, because no CTL control pulses are present on the respective tape parts. Also, any unrecorded part at the end of the tape 4 is not counted with this method.

In step B, as the winding operation a fast forward winding operation or a fast rewind winding operation may be used. In case of a fast rewind operation, in the first step A the tape 4 has to be wound to the end of the tape 4.

In the next step D, the micro-controller fetches a value, which gives a measure for the capacity of the storage medium, for example of a recordable DVD. This value can be stored already in advance in a memory of the appliance 1, or may be obtained from the storage medium via an information stored on the medium, by reading a respective area on the storage medium.

In the next step E, a compression rate is calculated by taking into account the total number of control pulses CTL, as counted in the memory, and the capacity of the storage medium. With this compression rate the recordings R1, R2, R3 will be converted into a digital data stream, before they are written onto the storage medium. In particular, the compression rate is chosen as low as possible for using the complete capacity of the storage medium. A small reserve can be included, to take into account counting errors of the CTL control pulses during step B, the scanning of the tape in the fast winding operation. The compression rate is then chosen slightly higher. There may exist also already given compression rates according to a standard for writing onto the storage medium. Then, the lowest compression rate is chosen, which allows just to write all the recordings of the tape onto the storage medium.

When scanning the tape for counting the CTL control pulses, step B, the SP, LP and EP recordings can be distinguished, because the number of the CTL pulses per time interval is different for each of these recording modes, because of the different tape speeds used by these recording modes. Therefore, in a preferred embodiment, different compression rates can be selected for different recording modes in step E, for example using a compression rate for Long Play, which is twice as high as the compression rate for the Standard Play modus.

In the step F, the tape 4 is rewound to the beginning of the tape. The step F can be performed also before step D or E, or likewise the steps D and E can be performed at the same time as step F.

In the next step G, all the data of the tape 4, recordings R1, R2, R3, are read during a playback operation of the tape recorder 3, converted into a digital data stream by using the calculated compression rate, as described above, and written onto the storage medium with the optical recorder 2. In this step, the complete tape length of tape 4 is scanned in a forward playback operation. The data, as recorded in recordings R1, R2, R3, are read in this step according to the respective recording standard, i.e. Standard Play SP, Long Play LP, and Extended Long Play EP.

Figure 4:
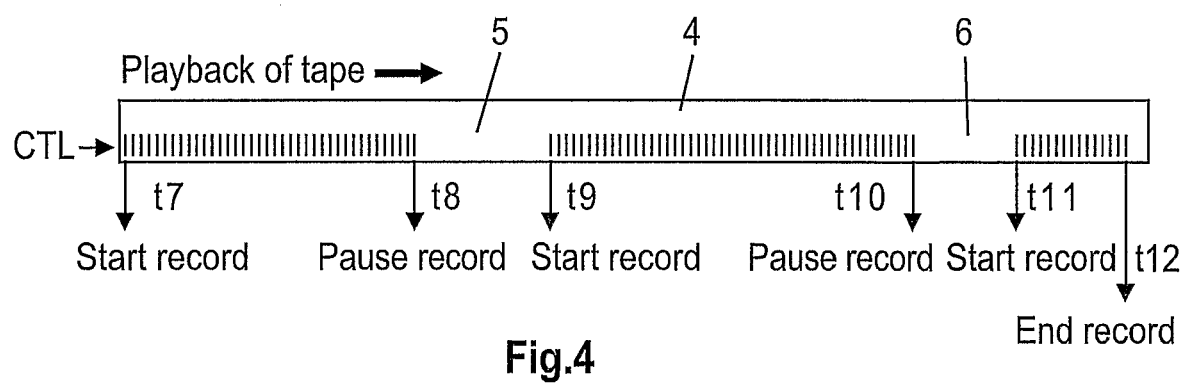

During the blank parts 5 and 6, the optical recorder 2 performs a pause. The optical recorder 2 is therefore only recording during the time intervals t7-t8, t9-t10 and t11-t12, as shown in FIG. 4, because the blank parts 5 and 6 are skipped or omitted during the playback of the tape 4. The blank parts 5 and 6 can be skipped in a fast forward winding operation, or by a standard play forward operation. During the time intervals t8-t9 and t10-t11 therefore, no recording operation of the recorder 2 takes place, and at time t12, the recording operation is finished. The inserted storage medium is then finalized, when required by a respective recording standard of the storage medium.

The storage medium contains now all the recordings as made on the tape 4, and the capacity of the storage medium is used in an optimum manner. The method is therefore an automatic procedure, which can be started by a user, for example, by pushing a respective button on the appliance 1 or on the remote control. As the essential requirements, it has to be guaranteed that a tape with recordings is inserted into the tape recorder 3, and a storage medium is inserted into the optical recorder 2.

Figure 3:
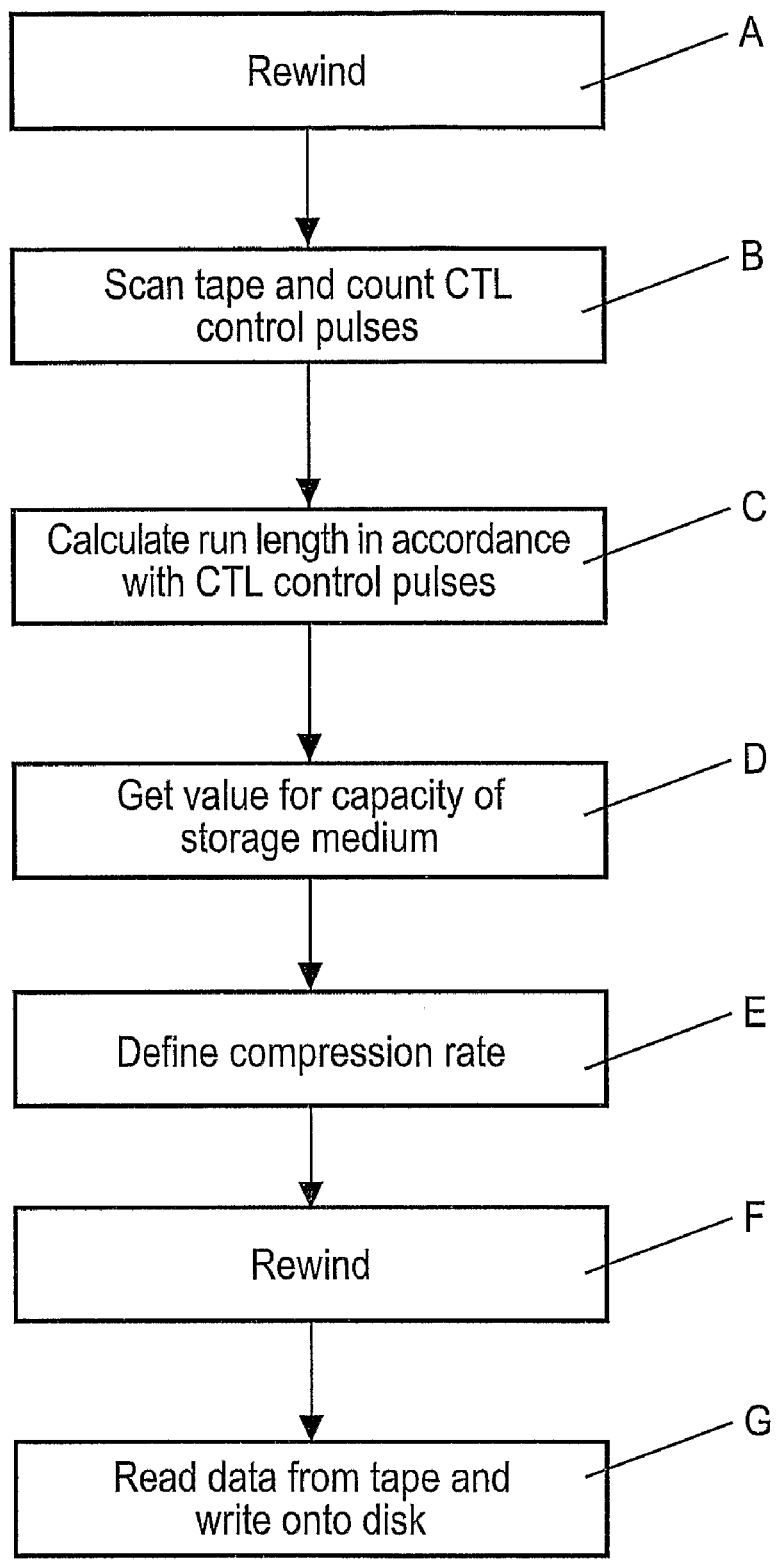

In another preferred embodiment, step A, as shown in FIG. 3, is omitted. The tape 4 is therefore not rewound to the beginning of the tape. Then only the data of the tape, lying before the tape position as inserted, are scanned in step B. With this method, a user can skip a first part of the tape 4. Before performing step B, the micro-controller of the appliance 1 remembers in this embodiment the tape position, at which the tape 4 is inserted into the tape recorder 3. In step F, the tape is then rewound only to this tape position.

The method, as described with regard to FIG. 3, is performed by the micro-controller included in the appliance 1, as shown in FIG. 1. The appliance 1 comprises further at least a first memory associated with the micro-controller (not shown), in which the number of control pulses CTL is counted, and a second memory, in which the method is stored in form of command steps for the micro-controller. The micro-controller operates the media recorder 2 and the tape recorder 3 according to these command steps, when a respective copy operation is initiated by a user via a button on the appliance 1 or a button on the remote control of the appliance 1.

The present invention is not limited to the embodiments as described with regard to the figures, and various available modifications come possible for those skilled in the art without departing from the scope of the invention. For example, as a storage medium also a flash memory card or any other semiconductor memory may be used, the appliance 1 comprising then a respective media recorder instead of the optical recorder 2. As optical media, the optical recorder may use write once optical disks or rewritable optical disks with a large variety of storage capacities. Instead of an optical recorder 2, also a hard disk recorder (HDD) with a fixed hard disk or a replaceable hard disk may be used.

The appliance 1 may comprise in a further embodiment in particular a media player, for example a DVD player, a media recorder, for example a DVD or a CD recorder, a micro-controller, a memory and an encoder with a selectable compression rate. Such an appliance allows to copy data from a first storage medium onto a second storage medium, by scanning the first storage medium for defining the total length of recordings present on the first storage medium, defining a compression rate in dependency of the total length of the recordings and in dependency of a memory capacity of the second storage medium, and reading the data from the first storage medium and writing the data onto the second storage medium by using said compression rate. The first storage medium can be for example an optical storage disk and the second storage medium also an optical storage disk, a hard disk or a semiconductor device. The appliance then allows to copy recordings of an optical storage disk with a high capacity, for example a Blue-ray disk or a HD-DVD, onto a second storage medium with a comparatively smaller capacity, for example a CD or a DVD, by using the full capacity of the second storage medium.

The invention claimed is:

1. Method for copying data from a tape onto a storage medium, comprising the steps of;
    scanning the tape in a fast winding operation,
    counting control pulses present on the tape during the fast winding operation in a counter,
    defining a compression rate in dependency of the number of control pulses and the capacity of the storage medium, and
    reading the data from the tape and writing the data onto the storage medium by using said compression rate.

2. Method according to claim 1, wherein the control pulses are pulses recorded on a longitudinal track of the tape together with a helical scan recording, and wherein the run length of the recording is calculated from the number of control pulses.

3. Method according to claim 1, wherein after a command of a user for initiating the method, a winding operation for winding the tape to the beginning or to the end of the tape is performed first.

4. Method according to claim 1, wherein during the fast winding operation for counting the control pulses, the complete tape is scanned, and then wound to the beginning or to the end of the tape for performing a one touch copy operation for copying all recordings of the tape onto the storage medium.

5. Method according to claim 1, wherein before calculating the compression rate for the recording, the storage medium is checked for defining the maximum recording time.

6. Method according to claim 1, wherein when calculating the compression rate for the recording, a reserve is included for taking into account counting errors of the control pulses.

7. Method according to claim 1, wherein the control pulses of a standard play recording and the control pulses of a long play recording are counted in different counters, and that a higher compression rate is defined for the recording performed in the long play modus.

8. Method according to claim 1, wherein the storage medium is an optical storage disk, a hard disk or a semiconductor device.

9. Appliance comprising a media recorder, a tape recorder, a micro-controller and a first memory, wherein the micro-controller performs a method according to claim 1, using the first memory for storing the control pulses.

10. Appliance according to claim 9, wherein the method is stored as a program in a second memory of the appliance associated with a micro-controller, and that the micro-controller performs the method, when initiated by a user via a control button of the appliance.

11. Appliance according to claim 9, wherein the media recorder is a DVD recorder and the tape recorder is at least one of a VHS tape recorder and a DV recorder.

* * * * *